March 26, 1929. G. A. GROS 1,706,730
METHOD OF AND MEANS FOR FORMING COMPOSITE ARTICLES
Filed July 9, 1924 6 Sheets-Sheet 4

Inventor:
Gustave Adolph Gros.
by [signature] Atty.

March 26, 1929.  G. A. GROS  1,706,730
METHOD OF AND MEANS FOR FORMING COMPOSITE ARTICLES
Filed July 9, 1924  6 Sheets-Sheet 6

Inventor:
Gustave Adolph Gros.

Patented Mar. 26, 1929.

1,706,730

UNITED STATES PATENT OFFICE.

GUSTAVE ADOLPH GROS, OF RIVERSIDE, ILLINOIS, ASSIGNOR TO WESTERN ELECTRIC COMPANY, INCORPORATED, OF NEW YORK, N. Y., A CORPORATION OF NEW YORK.

METHOD OF AND MEANS FOR FORMING COMPOSITE ARTICLES.

Application filed July 9, 1924. Serial No. 724,941.

This invention relates to a method of and means for forming composite articles, and more particularly to a method of and means for forming composite articles comprising molded elements having inserts.

The primary object of the invention is to provide a method of and means for producing articles of the character described which method and means will insure the production of articles of uniform quality and dimensions and will require a minimum of manual labor and supervision.

Another object of the invention is to provide an improved method of and improved means for forming the terminal assemblies for switchboard lamps of the type shown in the copending application of R. A. Price, Serial No. 713,461, filed May 15, 1924, the terminal assemblies each comprising a plurality of metallic terminals embedded in and projecting from a base of insulating material.

In a preferred embodiment of the invention the method is practiced in connection with apparatus for forming the above described terminal assemblies, the apparatus comprising means for forming the terminals from continuous strands of material and for molding a base on each pair of terminals.
The apparatus operates automatically so that the operator need only replenish the supplies of material for forming the terminals and bases when it becomes necessary to do so; the operator is not required to devote his entire time to a single machine.

Other objects and features of the invention will become apparent as the detailed description progresses, reference being had to the accompanying drawings, wherein

Fig. 4 is a transverse section taken on line 4—4 of Fig. 2;

It is believed that a complete understanding of the improved method will be obtained from a detailed description of the machine by which the method is practiced.

Figures 14, 15, 16, 17, 18:
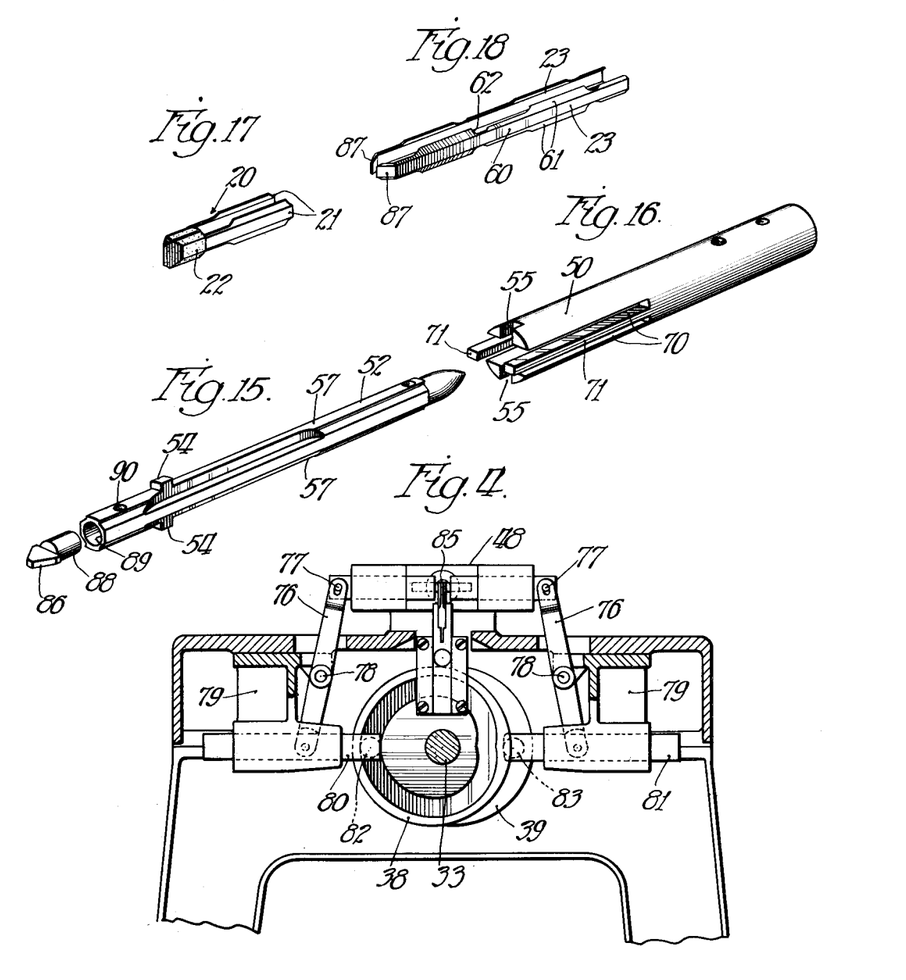
Figs. 15 and 16 are perspective views of certain details of the machine.
Fig. 17 is a perspective view of a terminal assembly which the machine illustrated in the aforementioned figures is adapted to produce.
Fig. 18 is a perspective view of a plurality of strands of metal from which the terminals are formed.

Referring to Fig. 17, the reference character 20 designates in its entirety the terminal assembly of a switchboard lamp of the type shown and described in the aforementioned co-pending application. The terminal assembly 20 comprises a plurality of metallic terminals 21 embedded in a base 22 of insulating material. The embodiment of the invention illustrated in Figs. 1 to 16, inclusive, is adapted to produce this terminal assembly 20, the terminals 21 being formed from continuous strips of metal indicated by the reference numeral 23. The base 22 is formed upon the terminals by molding means hereinafter described.

Figure 1:
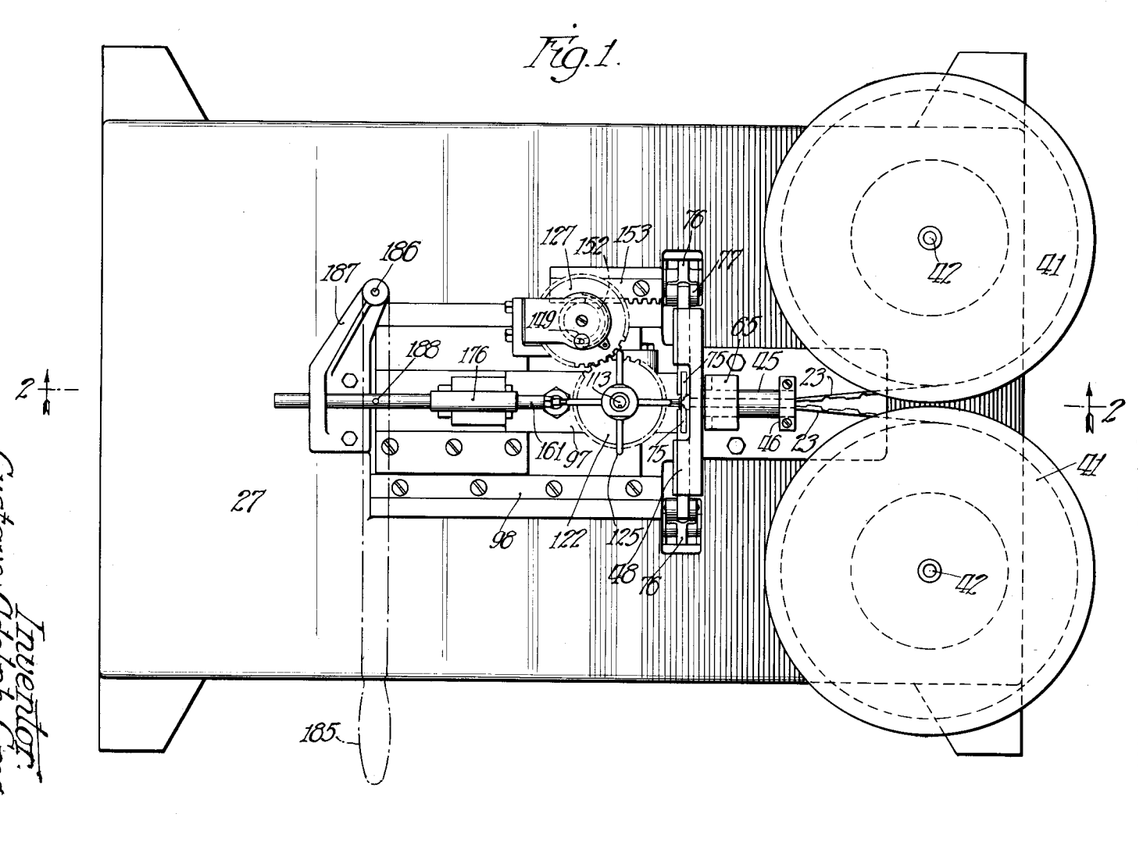
Fig. 1 is a plan view of a machine embodying the invention.
Figures 2, 14:
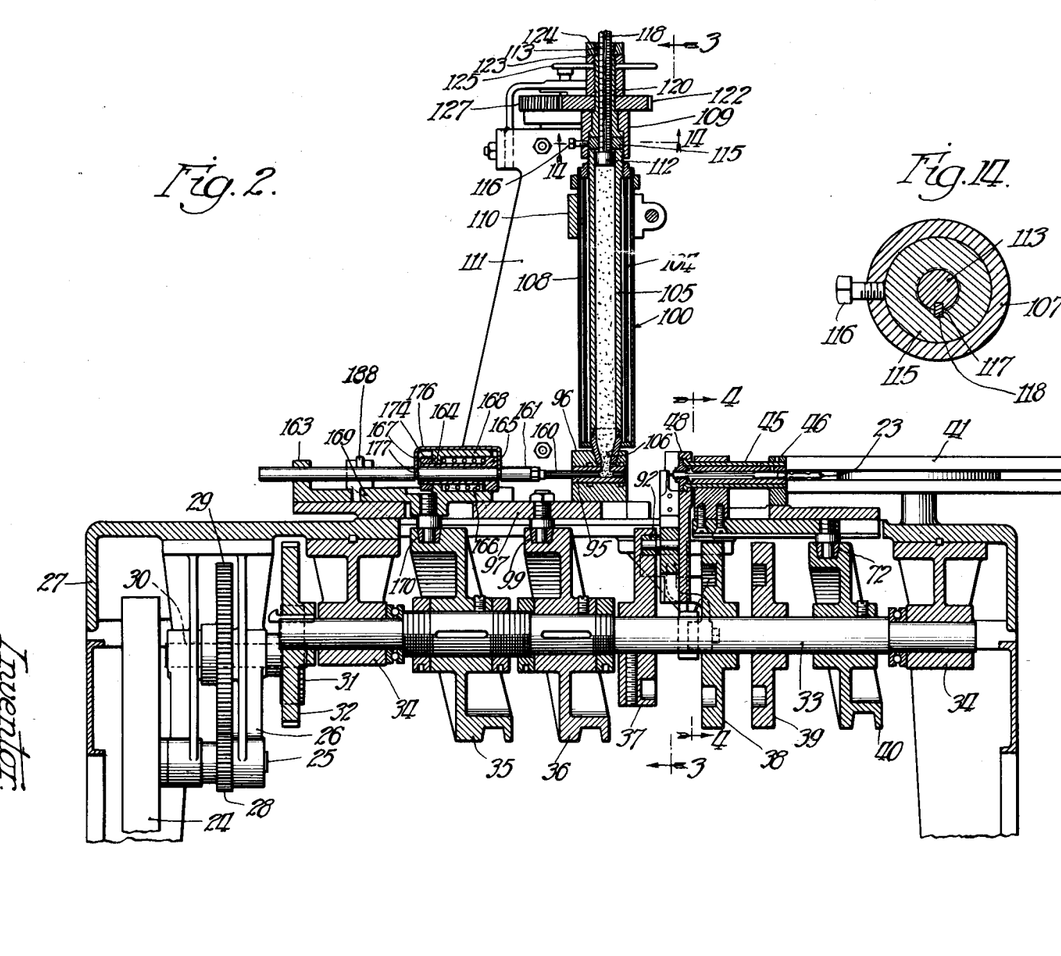
Fig. 2 is a longitudinal section taken on line 2—2 of Fig. 1.
Fig. 14 is a section taken on line 14—14 of Fig. 2.

Referring now to Figs. 1 and 2, the machine comprises a pulley 24 rigidly secured upon one end of a shaft 25 which is rotatably journaled in a bearing bracket 26 depending from the frame 27 of the machine. The pulley 24 may be driven by any suitable means (not shown) and is adapted to operate the machine through the medium of a pinion 28 keyed to the shaft 25. The pinion 28 meshes with a gear 29 fastened to a shaft 30 rotatably journaled in the bearing bracket 26. A pinion 31 secured to the shaft 30 meshes with a gear 32 keyed to a shaft 33 rotatably journaled in a plurality of bearings 34 depending from the frame 27. The shaft 33 carries a plurality of cams 35, 36, 37, 38, 39, and 40 which are adjustably secured to the shaft and are adapted to actuate the various mechanisms of the machine in a proper sequence.

Figures 5, 8, 9, 10:
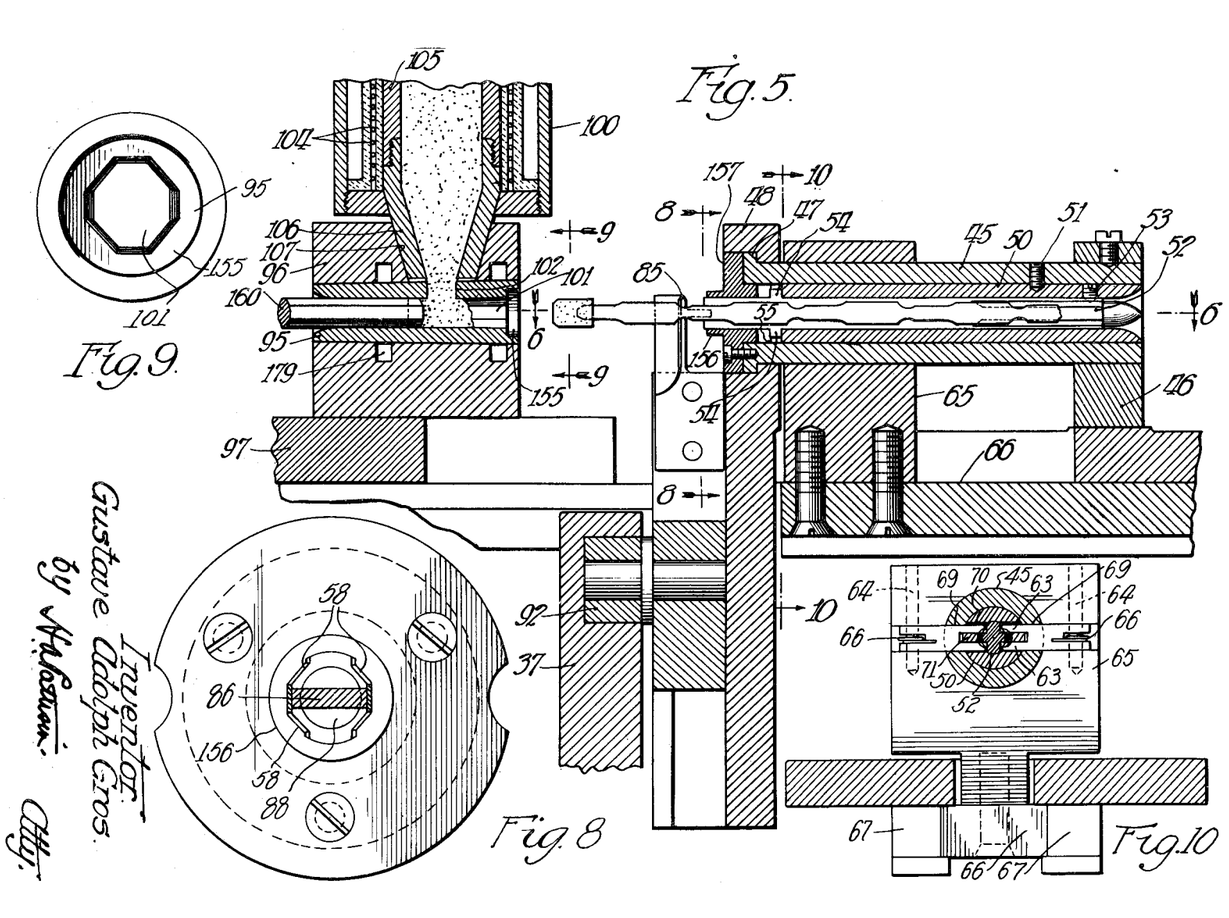
Fig. 5 is an enlarged fragmentary section taken on substantially the same line as Fig. 2.
Figs. 8, 9, and 10 are sections taken on lines 8—8, 9—9, and 10—10, respectively, of Fig. 5.
Figure 6:
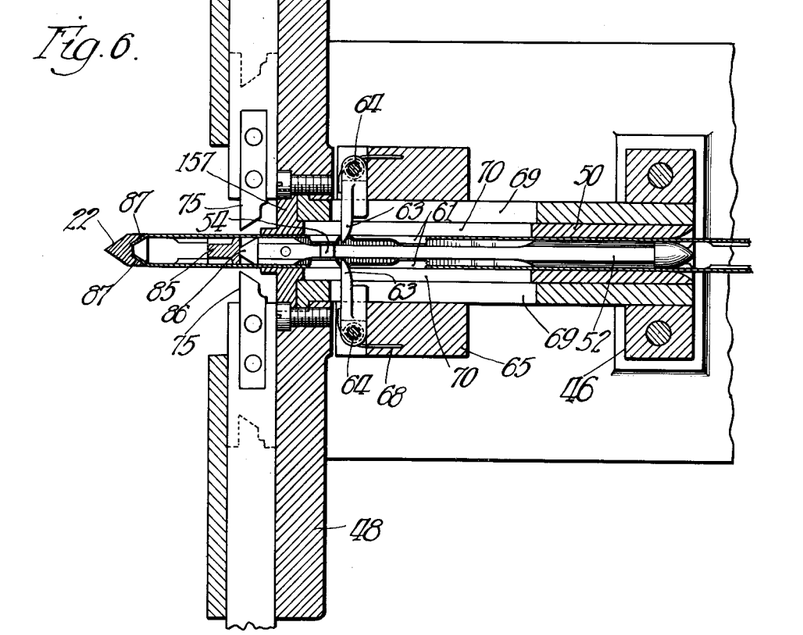
Fig. 6 is a plan section taken on line 6—6 of Fig. 5.
Figure 7:
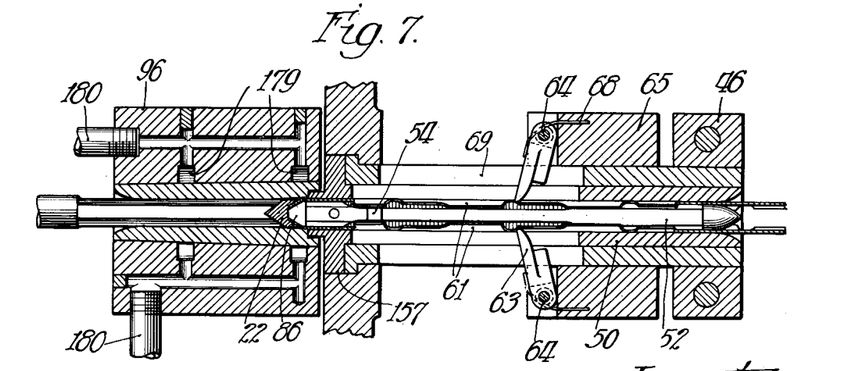
Fig. 7 is a plan section taken on the same line as Fig. 6, but showing several parts of the machine in changed positions.

The cam 40 is associated with mechanism for withdrawing the metallic strands 23 from a pair of reels 41 rotatably journaled upon pins 42 projecting from the frame 27, the mechanism being adapted to advance the strands to a molding position where each pair of terminals are provided with a base 22 before the terminals are severed from the strands. The mechanism for advancing the strands 23 comprises a tubular housing 45 having one end thereof secured in a block 46 carried by the frame 27 and having the other end thereof seated in a recess 47 formed in a bracket 48 secured to the frame 27, (Figs. 5, 6, and 7). A tubular member 50 disposed within the tubular housing 45 is secured against displacement relative to the housing by a set screw 51 (Fig. 15). A pin 52 disposed within the tubular member 50 is secured thereto by a set screw 53, the pin 52 being provided with a plurality of outstanding lugs 54 adapted to rest in a plurality of slots 55 formed in one end of the tubular member 50 (Figs. 15 and 16). The function of the lugs 54 is to prevent angular displacement of the pin 52 relative to the tubular member 50 as well as to insure that these parts will be assembled in the proper manner. As best shown in Fig. 15 the pin 52 is provided with a plurality of arcuate side surfaces 57 adapted to engage the inner surface of the annular member 50, the remaining side surfaces of the pin 52 being spaced from the inner surfaces of the tubular member 50 to provide a plurality of passages 58 (Fig. 8) through which the metallic strands 23 may be advanced. Each of the metallic strands 23 comprises a substantially flat central portion 60 and a plurality of flanges 61 disposed at an angle to the flat portion 60. The flanges 61 are of varying cross-section and so provide a plurality of shoulders 62. These shoulders 62 are adapted to be engaged by a plurality of dogs 63 pivotally mounted upon pins 64 secured in a block 65 which is rigidly secured to a slide 66, the slide 66 being journaled in a plurality of ways 67. The dogs 63 are provided in pairs, the dogs of each pair being formed integral with each other. A spring 68 is provided for yieldingly holding each pair of dogs in positions wherein they may engage oppositely disposed shoulders 62 of the metallic strands 23. The dogs 63 are adapted to traverse a plurality of slots 69 formed in the tubular housing 45 and to traverse a plurality of slots 70 formed in the tubular member 50, and slots 70 forming a plurality of tongues 71 adapted to engage the substantially flat portions 60 of the metallic strands 23. This construction prevents the strands from buckling when they are advanced through the tubular member 50. The slide 66 is provided with an anti-friction roller 72 operatively engaging the cam 40 which is designed to reciprocate the slide together with the block 65 and the dogs 63. The arrangement is such that the dogs 63 will engage a plurality of shoulders 62 upon the strands 23 and advance the strands a unit distance for each cycle of operation of the machine.

In Figs. 5 and 6 the metallic strands 23 are shown in the positions in which they are brought by the dogs 63 directly before the end of each cycle of operation. A base 22 is shown on the forward ends of the metallic strands 23, the base 22 having been molded upon these ends directly before the strands were advanced by the dogs 63. It is readily understood that the base and the forward ends of the strands constitute a terminal assembly and that it is only necessary to sever the strands to complete a cycle of operation.

A plurality of cutting and forming dies 75 slidably journaled in the bracket 48 are adapted to sever the strands 23. The dies 75 are disposed in opposed relation and each die has its outer end loosely pivoted to one of a plurality of levers 76 by one of a plurality of pins 77. The levers 76 are pivotally mounted intermediate their ends upon pins 78 fastened in a plurality of brackets 79 depending from the frame 27. The lower end (Fig. 4) of each lever 76 is loosely pivoted to one of a plurality of slides 80 and 81 journaled in the brackets 79. The slide 80 is provided with an anti-friction roller 82 operatively engaging the cam 38 and the slide 81 is provided with an anti-friction roller 83 operatively engaging the cam 39. The cams 38 and 39 are designed to drive the dies 75 toward each other directly before the end of each cycle of operation, the dies being adapted to cooperate with an anvil 85 to sever the strands 23 and to cooperate with wedge-shaped die member 86 to form the severed ends of the strands into anchorage portions as indicated at 87 in Fig. 18. The die member 86 comprises a cylindrical portion 88 which fits snugly in a recess 89 bored into one end of the pin 52, the pin 52 being provided with an aperture 90 through which a drift pin may be inserted to drive the cylindrical portion 88 out of the recess 89 when it becomes necessary to replace the die member 86. It will be noted that the thickness of the wedge-shaped portion of the die member 86 is less than the width of the metallic strands 23. The purpose of this construction will presently appear.

The anvil 85 is slidably journaled in the bracket 48 and is provided with an anti-friction roller 92 riding in the track of the cam 37, the cam 37 being adapted to bring the anvil into an operative position with respect to the dies 75 immediately before the end of a cycle of operations and to withdraw the anvil from that position immediately after the strands 23 have been severed.

As best shown in Figs. 1, 5, and 7 a mold 95 in horizontal alignment with the forward ends of the strands 23 is fixed in a block 96 rigidly secured to a slide 97, the slide 97 being journaled in ways 98 on the frame 27. The slide 97 is provided with an antifriction roller 99 which rides in the track of the cam 36. The cam 36 when revolved will reciprocate the slide 97 and cause it to bring the mold 95 into and out of the molding position.

A vertically disposed container 100 movable with the block 96 communicates with the mold cavity 101 by way of an aperture 102 in the mold. The container 100 is adapted to hold a supply of moldable matter which is heated by means of an electrical resistor 104 carried by the container, suitable means (not shown) being provided for connecting the resistor with a supply of electrical energy. The container 100 preferably comprises a tube 105 into the lower end of which is threaded a tapered nozzle 106 adapted to rest in a like shaped aperture 107 formed in the block 96. The resistor 104 is disposed concentrically with respect to the tube 105, the tube 105 and the resistor 104 being enclosed within a cylindrical housing 108. A collar 109 is threaded upon the upper end of the tube 105. A split bracket 110 is adapted to clamp the container 100 in an operative position with respect to the mold 95, the bracket 110 being rigidly secured to an upright bracket 111 formed integral with the slide 97. This construction permits the container to be quickly replaced when empty in a manner hereinafter explained.

A piston 112 disposed in the tube 105 has in integral threaded rod 113 projecting upwardly through the collar 109. A collar 115 disposed within the collar 109 is held against angular displacement relative to the collar 109 by a set screw 116. The collar 115 is provided with a feather key 117 which rides in a key-way 118 cut in the rod 113 and thus holds the rod against angular displacement relative to the tube 105. A sleeve 120 rotatably journaled in the upper end of the collar 109 and threadedly engaged with the rod 113 comprises means for displacing the piston 112 longitudinally of the tube 105, means being provided for rotating the sleeve. The latter means comprises a gear 122 carried by the sleeve 120 and clamped against a shoulder thereon by means of a collar 123 threaded upon the sleeve 120 and secured against accidental displacement relative to the sleeve by a lock nut 124. The collar 123 is provided with a plurality of handles 125 whereby the operator can rotate the collar and the gear 122 to displace the piston 112 along the tube 105.

Figures 3, 11, 12, 13:
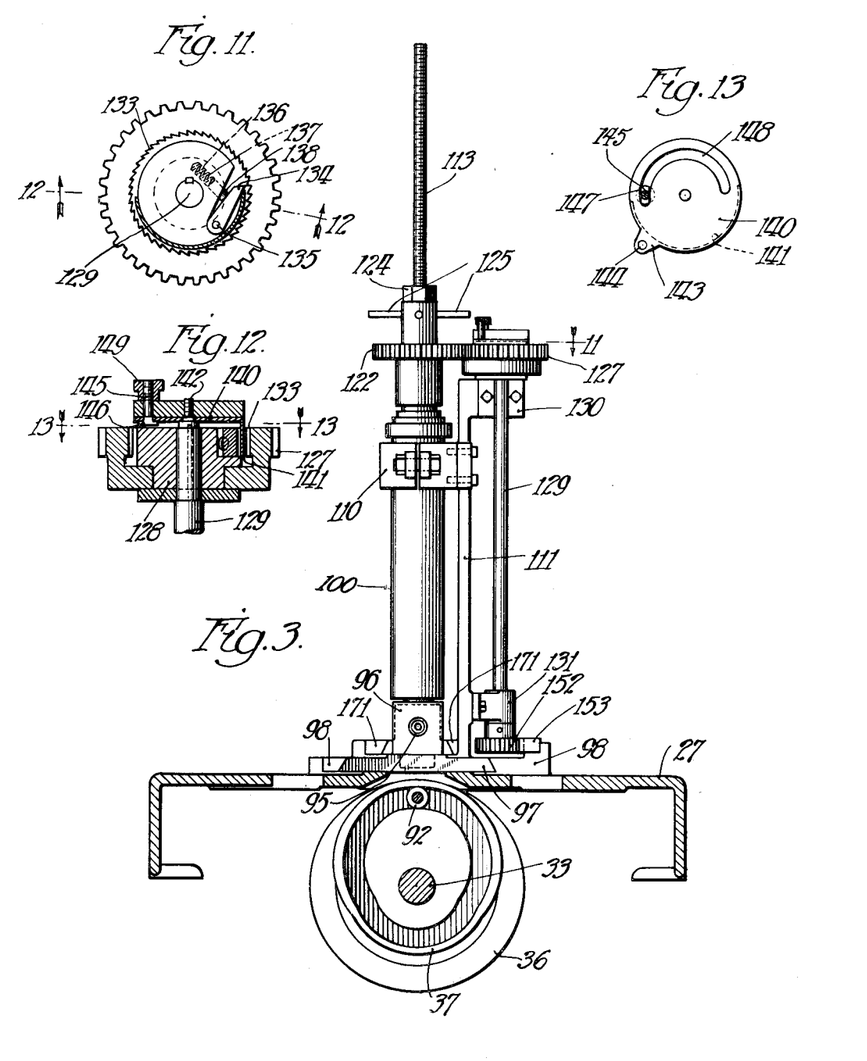
Fig. 3 is a transverse section taken on line 3—3 of Fig. 2.
Fig. 11 is a section taken on line 11—11 of Fig. 3.
Fig. 12 is a section taken on line 12—12 of Fig. 11.
Fig. 13 is a section taken on line 13—13 of Fig. 12.

The gear 122 meshes with a gear 127 rotatably journaled upon a collar 128 keyed to a vertically disposed shaft 129 which is rotatably journaled in a bearing 130 and a bearing 131, the bearings 130 and 131 being secured to the upright bracket 111 (Figs. 3, 11, and 12). The gear 127 is substantially ring-shaped in form and has an internal cylindrical surface in which a plurality of ratchet teeth 133 are cut. A pawl 134 pivotally secured to the collar 128 by a pin 135 is adapted to engage the ratchet teeth 133. A compression spring 136 disposed in a bore 137 in the collar 128 urges a pin 138 toward the pawl 134 and the pin 138 in turn urges the free end of the pawl into engagement with the teeth 133. It is obvious that if the shaft 129 is oscillated, the pawl 134 will engage the ratchet teeth 133 during the counter-clockwise (Fig. 11) oscillations of the shaft and rotate the gear 127 in a counter-clockwise direction (Fig. 11) in a step-by-step manner. Means is provided for controlling the angular distance through which the pawl 134 will engage the ratchet teeth 133, the means comprising a disk 140 having an arcuate flange 141 disposed in the path of the pawl. The disk 140 is pivotally secured to the upright bracket 111 by means of a shouldered screw 142, the longitudinal axis of the screw 142 being coincident with the axis of rotation of the shaft 129. As shown in Fig. 13 the disk 140 is provided with an extension 143. A pin 144 projecting upwardly from the extension 143 provides means whereby the operator may angularly displace the disk 140 and its arcuate flange 141 with respect to the axis of the shaft 129. The disk 140 may be locked in a plurality of adjusted positions by a threaded pin 145 having a head 146 adapted to clamp the disk against the upright bracket 111. The head 146 has a flattened portion 147 disposed in an arcuate slot 148 cut in the disk 140, the construction being such that the edges of the slot prevent the pin from turning on its own axis. A nut 149 threaded upon the pin 145 provides means for drawing the head 146 of the pin against the disk 140.

A gear 152 pinned to the lower end of the shaft 129 meshes with a rack 153 secured against displacement relative to the frame 27. It is readily understood that the reciprocatory movements of the slide 97 will be accompanied by an oscillatory movement of the shaft 129 as the shaft 129 travels with the slide and thus causes the gear 152 to roll upon the rack 153. This oscillatory movement of the shaft 129 will cause the ratchet 134 to rotate the gear 127 in a step-by-step manner, the gear 127 in turn rotating the gear 122 in a step-by-step manner. This rotation of the gear 122 will be accompanied by longitudinal displacement of a piston 122. The arrangement is such that the plunger 122 will be driven downward in the tube 105 a unit distance when the mold 95 is being advanced to the molding postion. When the plunger 122 is advanced in the tube 105, it will charge the mold 95 with a pre-determined quantity of moldable matter, the amount of moldable matter in each charge being determined by the operator who may adjust the disk 140 in the manner described above.

The mold cavity 101 is tapered to facilitate the operation of withdrawing the mold from a newly molded base 22 when the mold is to be returned to its functionally inoperative position (Figs. 5 and 9). The forward end of the mold cavity 101 is enlarged as indicated at 155 to receive the apertured boss 156 of a collar 157 rigidly secured to the inner end of the tubular housing 45. The apertured boss 156 forms an extension of the tubular member 50 and supports the molding end of the pin 52.

When the mold 95 is in the molding position, pressure is applied to the moldable compound in the mold by a plunger 160 having one of its ends slidably journaled in the mold. The other end of the plunger 160 is secured to one end of a rod 161 which has its other end slidably journaled in a bracket 163 mounted upon the slide 97. A sleeve 164 mounted upon the rod 161 is provided with a head portion 165 against which one end of a helical compression spring 166 rests. The other end of the compression spring 166 rests against an inwardly extending annular flange 167 of a recessed boss 168 formed integral with a slide 169, the slide 169 having an anti-friction roller 170 operatively engaging the cam 35. The slide 169 is journaled in a plurality of ways 171 carried by the slide 97. It will be noted that the compression spring 166 urges the head portion 165 of the sleeve 164 in a direction away from the annular flange 167. However, movement of the head portion 165 relative to the annular flange 167 in that direction is limited by a set collar 174 rigidly secured to one end of the sleeve 164. The outer end of the head portion 165 is normally disposed a slight distance in advance of the recessed boss 168. The rod 161 is locked to the slide 169 by a U-shaped clip 176 having bifurcated ends which engage a plurality of annular grooves 177 cut in the rod 161. As shown in Fig. 2 the head portion 165 normally rests against one end of the U-shaped clip 176.

The cams 35 and 36 cooperate to bring the plunger 160 and the mold 95 to the molding position as a unit, but when the mold reaches the molding position the plunger 160 continues to advance until it closes the aperture 102 in the mold and applies pressure to the charge of moldable matter in the mold cavity.

A plurality of annular grooves 179 in the block 96 provide means for subjecting the mold to the action of cooling fluid which is passed through the grooves by means of a plurality of pipes 180, suitable means (not shown) being provided for supplying the cooling fluid under pressure to one of the pipes 180. It is readily understood that the moldable matter under pressure in the mold cavity 101 cools to a solid state and adheres to the anchorage portions 87 prepared on the forward ends of the metallic strands 23.

The pressure to which the moldable matter in the mold is subjected is gauged by the compression spring 166 which will yield to allow the rod 161 and the sleeve 164 to be displaced with respect to the slide 177. The cam 36 is adapted to retract the mold 95 slightly in advance of the flange 160 so that the plunger will function as an ejector and prevent the newly molded base 22 from adhering to the tapered walls of the mold cavity. After the mold 95 has been withdrawn a short distance from the molding position the cam 35 causes the plunger 160 to return to its initial position.

In the event that the mold 95 becomes clogged, means is provided whereby the operator may actuate the plunger 160 independently of the cam 35. This means comprises a detachable operating lever 185 indicating in dot and dash lines in Fig. 1. The operating lever 185 may be pivotally mounted upon a pin 186 projecting from a bracket 187 mounted upon the frame 27. Intermediate its ends the lever 185 is apertured to receive a pin 188 projecting from the rod 161. It is obvious that if the operator first removes the clip 176 from the grooves 177 in the rod 161, the lever 185 may be employed to drive the plunger 160 through the mold cavity 101.

In the operation of the machine a plurality of reels 41, each holding a metallic strand 23, are placed upon the pins 42 and the forward ends of the strands are threaded through the passages 58. The supply of moldable matter in the container 100 is heated by means of the resistor 104. The pulley 24 is then driven from any suitable source of power and the machine automatically produces the terminal assemblies 20 until it becomes necessary to replenish the supply of metallic strands 23 or the supply of moldable matter in the container. The supply of metallic strands 23 may be replenished by replacing the reels 41 with others properly loaded. To replenish the supply of moldable matter, the container 100 is replaced by one holding a pre-heated supply of moldable matter. This is done by loosening the split bracket 110 so that the container may be drawn upwardly through the bracket together with the collar 109, the gear 122 and the other parts carried by the container. The container is unscrewed from the collar 109 and replaced by one fully charged with preheated moldable matter, the piston 112 being brought into its retracted positions. The fully charged container is then inserted in the bracket 112 which is adjusted to clamp the container in position, the gear 122 being meshed with the gear 127 after which the machine may be operated to produce terminal assemblies.

What is claimed is:

1. A method of forming composite articles, which method consists in preparing anchorage portions on a continuous strand of material, heating a supply of moldable matter, separating a predetermined quantity of moldable matter from said supply thereof, molding the moldable matter onto said anchorage portions, cutting the strand, and preparing anchorage portions on the strand for another molding operation.

2. A method of forming composite articles, which method consists in charging a mold with a predetermined quantity of moldable matter, then positioning one end of a continuous strand of material into the mold cavity, then exerting pressure upon the moldable matter in the mold to cause it to conform to the shape of the mold cavity, and then severing the strand.

3. A method of forming composite articles, which method consists in heating a supply of moldable matter, charging a mold with a predetermined quantity of moldable matter obtained from the supply thereof, then positioning one end of a continuous strand of material in the mold cavity, then exerting pressure on the moldable matter to cause it to conform to the shape of the mold cavity, and then severing the strand.

4. A method of forming composite articles, which method consists in preparing an anchorage portion on a continuous strand of material, charging a mold with a predetermined quantity of moldable matter, then inserting the anchorage portion in the mold cavity, then exerting pressure upon the moldable matter in the mold to cause it to conform to the shape of the mold cavity, then severing the strand and simultaneously preparing an anchorage portion on the strand.

5. In a molding machine, a mold, means for charging the mold with moldable matter, means for preparing an insert, means for causing relative motion between the mold and an insert whereby a portion of the insert is positioned in the mold cavity, means for exerting pressure of the moldable matter to cause it to conform to the shape of the mold cavity, and common means for actuating the several aforementioned means successively.

6. In a molding machine, a movable molding member having a mold cavity therein, a receptacle movable with the molding member for holding a supply of moldable matter, means for charging the molding member with a quantity of said matter, means for advancing one end of a strand of material into a molding position, means for bringing the molding member into and out of the molding position, means for cutting the strand, and common means for actuating the several aforementioned means.

7. In a molding machine, means for advancing a continuous strand of material, means for preparing an anchorage portion on the strand, a molding member having a mold cavity therein, means for bringing the molding member into and out of a position wherein said mold cavity accommodates said anchorage portion, and common means for actuating the several aforementioned means.

8. In a molding machine, means for advancing a continuous strand of material, means for preparing an anchorage portion on the strand, a molding member having a mold cavity therein, means for bringing the molding member into and out of a position wherein said mold cavity accommodates said anchorage portion, means for severing the strand, and common means for actuating the several aforementioned means.

9. In a molding machine, means for advancing a continuous strand of material, means for preparing an anchorage portion on the strand, a molding member having a mold cavity therein, means for charging the molding member with a quantity of moldable matter, means for bringing the molding member into and out of a position wherein said mold cavity accommodates said anchorage portion, and common means for actuating the several aforementioned means.

10. In a molding machine, means for advancing a continuous strand of material, means for preparing an anchorage portion on the strand, a movable molding member having a mold cavity therein, means movable with the molding member for holding a supply of moldable matter, means for charging the molding member with a quantity of said matter, means for bringing the molding member into and out of a position wherein said mold cavity accommodates said anchorage portion, means for exerting pressure on the moldable matter in the molding member, means for severing the strand, and common means for actuating the several aforementioned means.

11. In a machine for forming composite articles, means for preparing an anchorage portion on a piece of material, means for molding an element on said anchorage portion, and common means for actuating said several means.

12. In a machine for forming a composite article, means for preparing one element of the article from a continuous strip of material, means for molding a second element of the article upon the first-mentioned element, and common means for actuating said several means.

13. In a molding machine, a frame, a mold slidably journaled on the frame, a driven shaft, means actuated by the driven shaft for bringing the mold into and out of a molding position, means movable with the mold for charging it with a quantity of moldable matter, and means held against displacement relative to the frame for actuating said last-mentioned means.

14. In a molding machine, a frame, a mold movably mounted on the frame, a driven shaft, means actuated by the driven shaft for bringing the mold into and out of a molding position, means movable with the mold for charging it with a quantity of moldable matter, and means held against displacement relative to the frame for actuating said last-mentioned means.

15. In a molding machine, a frame, a mold movably mounted on the frame, a driven shaft, means actuated by the driven shaft for bringing the mold into and out of a molding position, a receptacle movable with the mold for holding a supply of moldable matter, means for charging the mold with a quantity of said moldable matter, and means held against displacement relative to the frame for actuating said last-mentioned means.

16. In a molding machine, a frame, a mold movably mounted on the frame, a driven shaft, means actuated by the driven shaft for bringing the mold into and out of a molding position, a receptacle movable with the mold for holding a supply of moldable matter, adjustable means for charging the mold with a predetermined quantity of said moldable matter, and means held against displacement relative to the frame for actuating said last-mentioned means.

17. In a molding apparatus, a mold, means for charging the mold with a quantity of moldable matter, means for changing the shape of an insert, a driven shaft, and means actuated by the driven shaft for actuating said several aforementioned means successively.

18. In a molding apparatus, a mold, means for moving the mold into and out of a molding position, means for changing the shape of an insert, a driven shaft, and means actuated by the shaft for actuating the several aforementioned means successively.

19. In a molding apparatus, a mold, means for moving the mold into and out of a molding position, means for charging the mold with a quantity of moldable matter, means for changing the shape of an insert, a driven shaft, and means actuated by the driven shaft for actuating the several aforementioned means successively.

20. In a molding apparatus, a mold, means for bringing the mold into and out of a molding position, means for advancing a strand of material in a step-by-step manner to said molding position, means for severing the strand, and common means for actuating the several aforementioned means.

21. In a molding apparatus, a mold, means for advancing a strand of material in a step-by-step manner, means for causing relative motion between the strand and mold to position a portion of the strand in the mold, and common means for actuating the several aforementioned means.

22. In a molding apparatus, a mold, means for advancing a strand of material in a step-by-step manner, means for causing relative motion between the strand and the mold to position a portion of the strand in the mold, means for severing the strand, and common means for actuating the several aforementioned means.

In witness whereof, I hereunto subscribe my name this 28th day of June, A. D. 1924.

GUSTAVE ADOLPH GROS.